United States Patent [19]

Cook

[11] Patent Number: 4,717,117
[45] Date of Patent: Jan. 5, 1988

[54] VACUUM VALVE USING IMPROVED DIAPHRAGM

[75] Inventor: John E. Cook, Chatham, Canada

[73] Assignee: Bendix Electronics Limited, Chatham, Canada

[21] Appl. No.: 938,911

[22] Filed: Dec. 8, 1986

[51] Int. Cl.⁴ .......................................... F16K 31/145
[52] U.S. Cl. .................................. 251/61.1; 251/331; 92/98 R; 92/103 F
[58] Field of Search .......................... 92/98 R, 103 F; 251/61.1

[56] References Cited

U.S. PATENT DOCUMENTS

| | | | |
|---|---|---|---|
| 3,083,943 | 4/1963 | Stewart | 251/61.1 |
| 3,100,002 | 8/1963 | Moore | 251/61.1 X |
| 4,065,095 | 12/1977 | Johnson | 251/61.1 X |
| 4,221,361 | 9/1980 | Weingarten | 137/625.4 X |
| 4,231,287 | 11/1980 | Smiley | 92/98 R X |
| 4,454,893 | 6/1984 | Orchard | 251/61.1 X |

*Primary Examiner*—Harold W. Weakley
*Attorney, Agent, or Firm*—Markell Seitzman; Russel C. Wells

[57] ABSTRACT

A valve (10) comprising a plurality of passages (22,24), and an annular sealing area (30) in communication with one of the passages. The valve also includes a diaphragm (50), movably supported relative to the sealing area (30) in response to a force differential applied thereacross; including a thin, planar, flexible, non-metallic membrane (92) for sealably engaging against the sealing area.

4 Claims, 2 Drawing Figures

VACUUM VALVE USING IMPROVED DIAPHRAGM

BACKGROUND AND SUMMARY OF THE INVENTION

The present invention relates generally to pneumatic valves.

Pneumatic or vacuum valves usually include a housing member defining an inlet passage and outlet passage. A diaphragm is typically supported by the housing member and is movable relative to a seating surface formed on an extension of one of these passages such as the outlet passage. The diaphragm, in cooperation with the housing defines a pressure chamber having a control port for communicating pressure to the pressure chamber. In operation the diaphragm is moved in and out of engagement with the seating surface (sealing area) to control communication between the inlet passage to the outlet passage under the influence of control pressure signals. Typically these diaphragms are fabricated from a resilient, rubber-like product. Quite often the seating surface contains surface irregularities which prevent the formation of an adequate seal upon engagement by the diaphragm. This is especially true if housing is injection molded.

It is an object of the present invention to provide a valve which is devoid of deficiencies found in the art.

It is another object of the present invention to provide an improved diaphragm which self-compensates for surface irregularities formed in a valve sealing area or seating surface.

Accordingly the invention comprises: a valve including a plurality of passages, an annular sealing area formed relative to one of the passages, and a diaphragm supported relative to the sealing area and movable in response to a force differential applied thereacross including a thin, planar, flexible, non-metallic membrane for sealably engaging with the sealing area.

Many other objects and purposes of the invention will be clear from the following detailed description of the drawings.

DETAILED DESCRIPTION OF THE DRAWINGS

Figure 1:
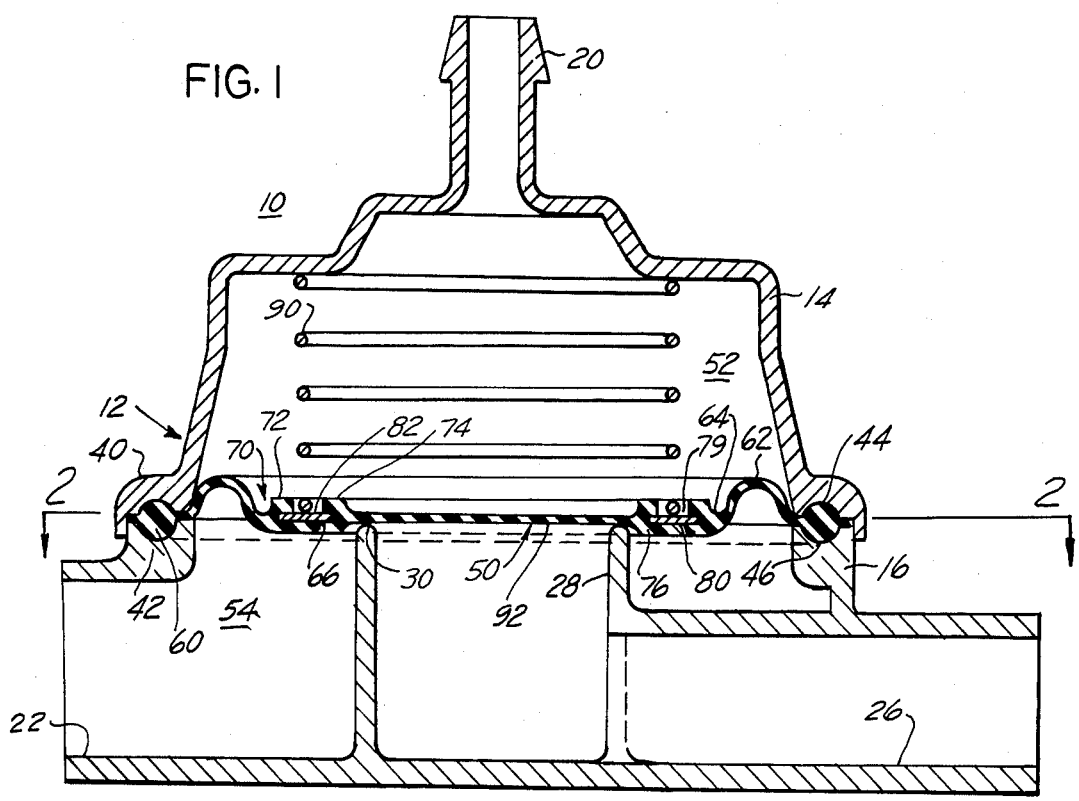
FIG. 1 illustrates a cross-sectional view of the present invention.
Figure 2:
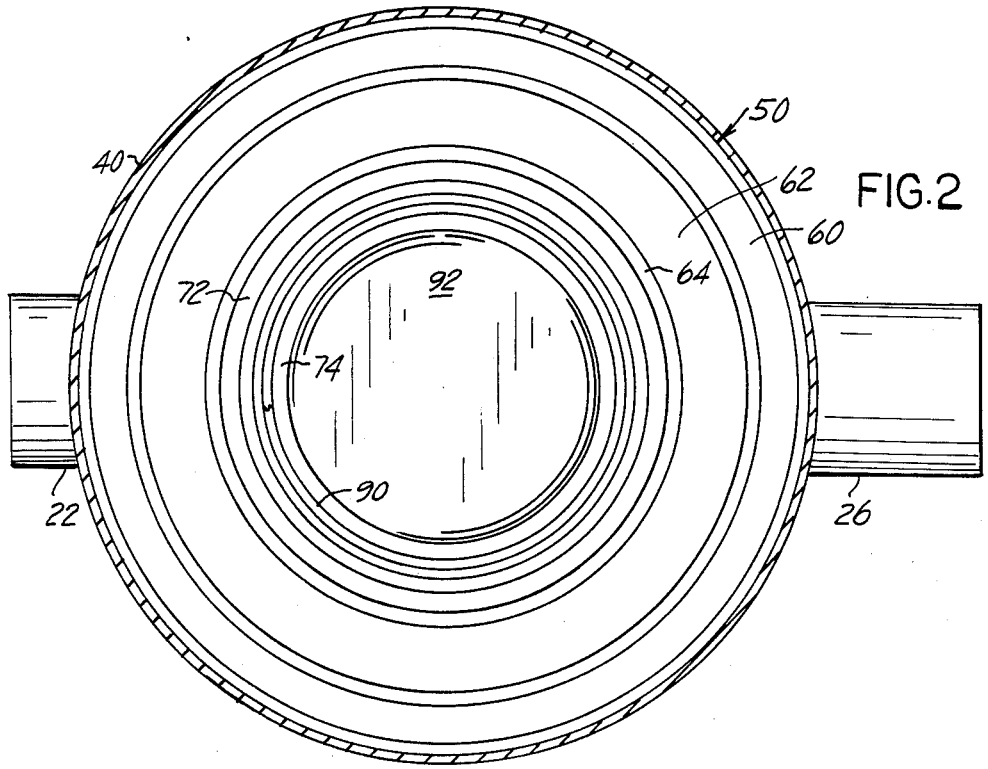
FIG. 2 illustrates an isolated top plan view of the diaphragm shown in FIG. 1.

With reference to FIG. 1 there is illustrated a vacuum valve generally shown as 10. The valve comprises a two part housing 12 which includes a cap 14 and a body 16. The cap 14 and the body 16 may be fastened together at peripheral edges thereof in ways known in the art. As an example the cap 14 and body 16 may be welded, such as ultra-sonically welded together at co-mating portions or alternatively the cap 14 may include a circumferential edge which is snap-fit about a detent formed in the housing. The cap includes a control port 20 adapted to communicate with a source of pressurized fluid such as air maintained at a vacuum pressure. The body 16 includes an inlet passage 22 and an outlet passage 26. Either the inlet passage 22 or the passage 26 may be formed within an extension such as extension 28 which extends into the body 16. The extension 28 terminates at an annular sealing area generally designated as 30. The housing 12, and more particularly the cap 14 and body 16, at peripheral edges 40 and 42 thereof include a plurality of spaced opposingly situated grooves 44 and 46 for receiving a diaphragm 50 therebetween. The diaphragm 50 divides the valve 10 into a pressure chamber 52 and a fluid chamber 54.

The diaphragm is preferably fabricated of a resilient material such as fluoro-silicon rubber. The material so chosen must exhibit stable characteristics with regard to the fluid environment communicated thereto. The diaphragm 50 includes an outer circumferential, generally annular, sealing bead 60. As can be seen from FIG. 1 the cross-section of the sealing bead is substantially circular. Positioned internal to the sealing bead is a convolute 62. Positioned inwardly of the inner edge 64 of the convolute 62 is an annular ring 66, preferably fabricated of a rigid material such as a stainless steel. Such ring may preferably be fabricated of metal. The ring 66 may be insert molded within a central, annular portion 70 of the diaphragm 50. More specifically, the annular portion 70 includes, spaced apart, axially extending, annular walls 72 and 74 and a bottom portion 76 which joins the bottoms of the walls forming a cavity 79 therebetween. The ring 66 is received within such cavity 79. As can be seen from the above this bottom portion 76 isolates a lower surface 80 of the ring 66 from the fluid communicated to the valve 10. Further, as can be seen from FIG. 1 an upper, uncovered surface 82 of the ring 66 is situated between the members 72 and 74 of the diaphragm 50. The surface 82 functions as a receiving surface for a spring 90 which biases the diaphragm against the cap 14 into engagement with the sealing area 30. The diaphragm 50 further includes a thin, flat, circular membrane 92 of substantially uniform thickness extends internally from the annular member 74. The membrane 92 is fabricated from a relatively thin wall of resilient material having a thickness of approximately 0.40.

In operation a control pressure is communicated to the control port 20 which urges the diaphragm off from the sealing area 30 thereby permitting fluid received at the inlet passage to flow through the outlet passage. Upon removal of the control pressure the diaphragm 50, under the action of the return spring 90, is urged against the sealing area. Due to the thinness of the membrane 92 it readily deforms to the shape of the surface irregularities on the sealing area and positively seals thereagainst to terminate flow between the inlet and outlet passages 22 and 26 respectively. It should be appreciated that the ring 66 in addition to providing a receiving surface for the spring 90, also provides a certain degree of rigidity to the central portion 70 of the diaphragm thereby permitting the diaphragm 50 to move as a whole into and away from engagement with the sealing area 30. While the preferred embodiment of the invention illustrates the use a ring 66 such ring 66 may be replace by using a central member 70 of increased bulk and stiffness. Further, while the preferred embodiment shows a vacuum valve the present invention is equally useable with valves which respond to positive pressure.

Many changes and modifications in the above described embodiment of the invention can, of course, be carried out without departing from the scope thereof. Accordingly, that scope is intended to be limited only by the scope of the appended claims.

I claim:

1. A valve comprising:

a plurality of passages (22,24) formed in a housing, and an annular sealing area formed about one of said passages;

a circular diaphragm, received within and supported by the housing and movably relative to said sealing area in response to a force differential applied thereacross; including a thin, planar, flexible, non-metallic membrane centrally disposed therein for sealably engaging said sealing area, means, disposed adjacent to the outer edge of the membrane, for stiffening such outer edge, comprising an increased thickness portion including an annular groove formed therein and a metal ring received into and secured within such groove, a flexible convolute disposed about said portion;

a spring received upon said ring for biasing the membrane into engagement with the sealing area.

2. The valve (10) as defined in claim 1 wherein said ring (66) includes an exposed surface (82) upon which said biasing means is received.

3. The valve (10) as defined in claim 1 wherein said diaphragm (50) is rubber and wherein the thickness of said membrane is between 0.25–0.75 mm.

4. The valve (10) s defined in claim 3 wherein said the approximate thickness of said membrane is 0.40 mm.

* * * * *